R. H. TALBUTT & B. O. HUTCHISON.
COFFEE POT.
APPLICATION FILED FEB. 16, 1914.
1,143,239.
Patented June 15, 1915.
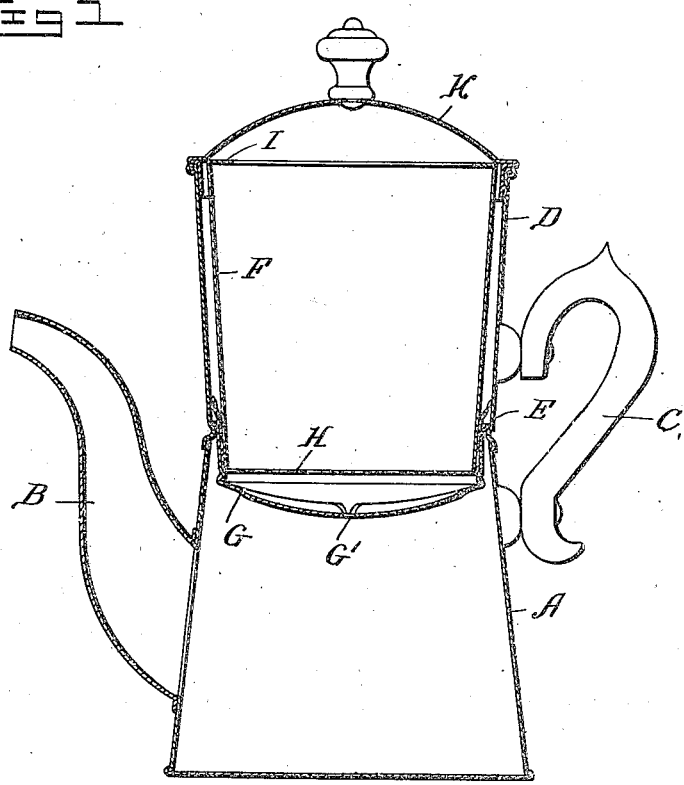
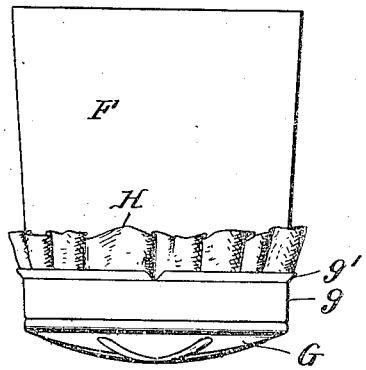
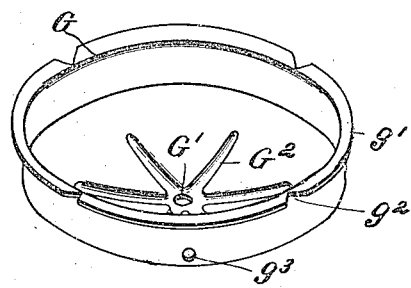
Inventors
Benjamin O. Hutchison
Robert H. Talbutt
By Church & Church
his Attorneys
Witnesses
Halbert Brown
M. H. Crandell

UNITED STATES PATENT OFFICE.

ROBERT H. TALBUTT, OF BALTIMORE, MARYLAND, AND BENJAMIN O. HUTCHISON, OF SPARTANBURG, SOUTH CAROLINA.

COFFEE-POT.

1,143,239.　　　　Specification of Letters Patent.　　Patented June 15, 1915.

Application filed February 16, 1914.　Serial No. 819,072.

*To all whom it may concern:*

Be it known that we, ROBERT H. TALBUTT and BENJAMIN O. HUTCHISON, citizens of the United States, residing at Baltimore, in the State of Maryland, and Spartanburg, in the county of Spartanburg and State of South Carolina, respectively, have invented certain new and useful Improvements in Coffee-Pots; and we do hereby declare the following to be a full, clear, and exact description of the same, reference being had to the accompanying drawings, forming part of this specification, and to the figures and letters of reference marked thereon.

This invention relates to coffee pots and more especially to coffee pots designed for making coffee in such quantities as is suitable for family consumption, the objects of the invention being to provide an exceedingly simple form of coffee pot with which drip coffee may be made without having its flavor injured or changed by the steaming of the coffee grounds or the condensation of the steam therein with subsequent dripping into the coffee extract, a further object being to provide a coffee pot which may be easily and quickly cleaned and which cannot be assembled with the parts in incorrect relation.

Referring to the accompanying drawings,—Figure 1 is a section in a vertical plane through a coffee pot embodying the present improvements. Fig. 2 is an elevation of the ground coffee holder. Fig. 3 is a perspective view of the removable bottom of the ground coffee holder.

Like letters of reference in the several figures indicate the same parts.

The body of the coffee pot is of conventional form and material, having the inwardly tapering side wall A with the spout B projecting from one side thereof and a handle C from the opposite side.

Above the body A is an upwardly extending and slightly flaring extension D which may be integral with the body part A, but at the junction of the two parts A and D an inwardly extending bead or flange E is formed in any well known way. Obviously, where the two parts are formed separately, the edge of one of the parts may be turned inwardly, or where they are formed in one piece, a bead may be formed, as shown in the accompanying drawings.

The inwardly extending flange or bead constitutes the support for a ground coffee holder formed in two parts adapted to clamp between them a fabric diaphragm through which the liquid passing through the coffee must drain away into the body of the receptacle below.

As shown, the ground coffee holder is of slightly conical form, as at F, to substantially conform to the downward taper of the extension D and at its lower end is adapted for the reception of the removable bottom G. The bottom is provided with an annular flange $g$ to fit around the lower edge of the holder F and has its upper edge flared outwardly at $g'$ to perform two functions, first, to engage the inwardly extending bead or flange on the body and thereby support the ground coffee holder in position within the coffee pot, as shown in Fig. 1, and secondly, to facilitate the application of the bottom to the lower edge of the ground coffee holder when a cloth diaphragm H has been stretched over the same, as will be readily understood from Figs. 1 and 2, it being understood that the bottom is normally held in place on the ground coffee holder by the friction between the parts. When in position in the coffee pot, the weight of the ground coffee and its holder are entirely supported by the removable bottom resting on the inwardly extending flange or bead. The bottom itself, besides serving as the means for retaining the fabric diaphragm in place, also performs an important function in retarding the flow of the liquid through the ground coffee and in preventing the steaming of the grounds when the coffee pot is allowed to sit for any length of time after the coffee is prepared. To enable the bottom to perform these functions it is dished downwardly at the center and provided with a single relatively small central aperture G' from which a series of grooves G² radiate toward the periphery of the bottom. The function of the grooves will be appreciated when it is remembered that the flexible diaphragm, under the influence of moisture and the weight of the ground coffee, may sag down so as to rest on the bottom, under which circumstances the grooves serve as conduits for conveying percolating liquid to the center opening where it escapes into the body of the pot. The small central opening does not offer a sufficient communication between the lower portion of the pot and the ground coffee holder to permit of any material passage of steam upwardly therethrough, so that the steaming of the grounds is effectually prevented, but in order to equalize the pressure above and below the ground coffee holder, the outwardly turned flange g' on the bottom G is notched as at g², thus permitting of the passage of air around the outer side of the ground coffee holder, and in addition, the periphery of said bottom is preferably provided with a small opening g³ through which any liquid held between the flange of the bottom and the holder itself may escape.

In constructing the ground coffee holder it is preferable to make use of sheet metal which is, of course, more or less flexible and liable to be distorted, and in order to stiffen this part of the device, and at the same time provide an effective means whereby it may be withdrawn from the coffee pot, its upper edge is provided with an inwardly extending annular flange I, as will be readily understood from Figs. 1 and 2.

Because of the tapering form of the ground coffee holder it will be seen that the bottom fits the same with a wedging action, thus insuring the retention of the bottom in place with security during the time that the holder is being inserted or removed from the coffee pot, and the tapering form of the parts has the additional advantage that it renders it impossible to assemble the parts in a wrong relation to each other. For example, the removable bottom cannot be placed on the top end of the ground coffee holder because the said top end is larger than the internal diameter of the flange of the bottom. The ground coffee holder cannot be positioned in the coffee pot itself, up-side down, because the tapering walls will not permit the upper end of the holder to pass down to a point where the cover K of the coffee pot may be placed in position.

Having thus described our invention, what we claim as new and desire to secure by Letters Patent of the United States, is:

1. In a coffee pot, the combination with the body forming a receptacle for the coffee having a pouring spout at one side thereof and an upward extension on said body with an inwardly extending annular projection at the junction of the body and extension, of a ground coffee receptacle fitting within said extension and embodying a circular inclosing wall open at top and bottom, a removable bottom seating on the lower portion of the holder and having an outwardly turned flange for coöperation with the annular projection at the junction of the body and extension whereby the weight of the coffee and its holder is entirely supported by the removable bottom and the bottom will be prevented from becoming separated from the holder, said bottom having a downwardly dished body portion with a relatively small liquid escape opening at the center thereof, and a fabric diaphragm clamped between the bottom and lower edge of the holder and forming a support for the ground coffee, substantially as described.

2. In a coffee pot, the combination with the body portion forming a receptacle for the coffee and having a spout and handle, as described, an upward extension on said body portion, with an inwardly extending bead at the junction between said body portion and extension, of a downwardly tapering ground coffee holder open at top and bottom, a removable bottom for said holder having its bottom portion dished downwardly and provided with a central escape opening and radiating grooves, and a flange portion into which the holder fits and whereby the bottom and holder are clamped together with a wedging action, said flanged portion having its upper edge flared outwardly and of greater diameter than the internal diameter of the bead at the junction of the body and extension, whereby said bead and outwardly flared portion of the bottom flange will coöperate in supporting the ground coffee holder in place, a fabric diaphragm clamped across the lower end of the said holder by the removable bottom and forming a support for the ground coffee, and a cover for the extension extending over and inclosing the upper end of the extension and ground coffee holder.

3. In a coffee pot, the combination with the body forming a receptacle for the coffee and having a spout and handle, as described, an upwardly flaring extension on said body and an inwardly projecting bead at the junction of the body and extension, of a downwardly tapering ground coffee holder open at top and bottom and having an inwardly extending flange at the upper end, a removable bottom for said ground coffee holder, having an inclosing flange flaring outwardly at the upper edge to coöperate with the inwardly extending bead and support the holder in position, openings for permitting of the passage of air past the bead and flange, the body portion of said bottom being dished and provided with a relatively small escape opening with channels radiating therefrom, a fabric diaphragm clamped across the lower end of the holder by the removable bottom and forming a support for the ground coffee, and a cover for the body extension arranged over the ground coffee holder, substantially as described.

ROBERT H. TALBUTT.
BENJAMIN O. HUTCHISON.

Witnesses to signature of Robert H. Talbutt:
ALEXANDER S. STEUART,
THOMAS DURANT.

Witnesses to signature of Benjamin O. Hutchison:
E. S. ALDERMAN,
M. O. GENTRY.